United States Patent [19]
Kondou et al.

[11] Patent Number: 5,567,467
[45] Date of Patent: Oct. 22, 1996

[54] SOFT CANDY AND PROCESS FOR PRODUCING THE SAME

[75] Inventors: Tsutomu Kondou; Akifumi Yuki, both of Kanagawa, Japan

[73] Assignee: Nikken Chemicals Company, Limited, Tokyo, Japan

[21] Appl. No.: 416,002

[22] Filed: Apr. 4, 1995

[30] Foreign Application Priority Data

Apr. 8, 1994 [JP] Japan ..................................... 6-070674

[51] Int. Cl.$^6$ ........................................................ A23G 3/00
[52] U.S. Cl. ........................... 426/659; 426/660; 426/804
[58] Field of Search .................................. 426/658, 660, 426/572, 571, 659, 804, 548

[56] References Cited

U.S. PATENT DOCUMENTS

| | | | |
|---|---|---|---|
| 4,883,685 | 11/1989 | Kondou | 426/658 |
| 5,236,730 | 8/1993 | Yamada et al. | |

FOREIGN PATENT DOCUMENTS

| | | | |
|---|---|---|---|
| 0009325 | 4/1980 | European Pat. Off. | |
| 0303295 | 2/1989 | European Pat. Off. | |
| 0630573 | 12/1994 | European Pat. Off. | |
| 4320647 | 11/1992 | Japan | A23G 3/00 |
| 7123923 | 5/1995 | Japan. | |
| 9200016 | 1/1992 | WIPO. | |

*Primary Examiner*—Jeanette Hunter
*Attorney, Agent, or Firm*—Sughrue, Mion, Zinn, Macpeak & Seas

[57] ABSTRACT

A soft candy is disclosed, which comprises erythritol, a sugar or a sugar alcohol other than erythritol, a fat and an emulsifier. A process for producing a soft candy is also disclosed, which comprises concentrating a mixture of erythritol with a sugar or a sugar alcohol other than erythritol and water by heating, adding a fat, in which an emulsifier has been dispersed, thereto and homogeneously kneading the resulting mixture. The soft candy of the present invention comprising erythritol as the main sweetening component is not coarse but smooth in texture. In addition, it is low-caloric and low-corrosive compared with the existing ones containing sucrose.

13 Claims, No Drawings

SOFT CANDY AND PROCESS FOR PRODUCING THE SAME

FIELD OF THE INVENTION

This invention relates to a soft candy which comprises erythritol as the main sweetening component and a process for producing the same.

BACKGROUND OF THE INVENTION

A soft candy is a candy product prepared by using sucrose and thick malt syrup as the main component, adding fat and an emulsifier optionally together with dairy products, if required, thereto, concentrating the resulting mixture by heating under atmospheric or reduced pressure, molding the candy dough thus obtained and then solidifying the same by cooling. There are various soft candies and the consumption of these products amounts to a high level. However it has been recently pointed out that the excessive intake of sugar, in particular, sucrose causes an increase in the morbidity of decayed teeth and accelerates obesity and diabetes.

Under these circumstances, confectioners have developed a number of sugar-free sweet foods which are low in calories and less corrosive. Some of these products have already been put on the market. Recently, there has been developed a method for producing erythritol, which is a sugar alcohol of a tetrose, and erythritol has been marketed as a low-caloric, non-corrosive sweetener. Thus attempts have been made to apply erythritol to various sweet foods.

Regarding the application of erythritol to hard candies, for example, JP-B-56-18180 (corresponding to EP-A-9325; the term "JP-B" as used herein means an "examined Japanese Patent Publication") has disclosed a process for producing a sugar-free candy by using erythritol. Also JP-A- 64-47348 (corresponding to U.S. Pat. No. 4,883,685; the term "JP-A" as used herein means an "unexamined published Japanese Patent Application") has disclosed a process for producing a hard candy which contains from 30 to 80% by weight of erythritol.

Further, JP-A-4-320647 has disclosed a process for producing a hard candy which contains at least 80% by weight of erythritol.

However hard candies comprising erythritol as a starting material are disadvantageous in that when erythritol is contained in a large amount, the candies are highly brittle and liable to be broken during the production, distribution or selling process. The above-mentioned patents aim at solving these problems.

In addition, these products are all hard candies and thus it has been required to develop a low-caloric and less corrosive soft candy having a smooth texture.

Compared with other sugars such as sucrose, erythritol crystallizes at an extremely high rate. Thus no soft candy of excellent qualities can be obtained simply by substituting erythritol for sucrose in a conventional method for producing a soft candy. That is to say, when erythritol is mixed with fat and an emulsifier, concentrated by heating and then cooled, the obtained candy is neither soft or smooth but coarse in texture due to the large crystals of erythritol thus formed.

SUMMARY OF THE INVENTION

It is an object of the present invention to provide a low-caloric and less corrosive soft candy which is not coarse but smooth in texture, has a refreshing taste and is not very sticky to teeth as well as a process for producing the same.

According to the present invention, a soft candy having a smooth texture can be obtained by using erythritol, a sugar or a sugar alcohol other than erythritol, a fat and an emulsifier as the starting materials.

DETAILED DESCRIPTION OF THE INVENTION

Now, the present invention will be described in greater detail. Erythritol to be used in the present invention as the starting material is a sugar alcohol of a tetrose which is highly soluble in water and highly liable to crystallize. It is present in the form of beautiful white crystals. It has a sweetness intensity corresponding to about 75% of that of sucrose and gives a refreshing and cool taste.

Examples of the sugar usable in the present invention include glucose, fructose, maltose, maltotriose, isomerized sugars, dextrin, thick malt syrup, sucrose, fructooligosaccharide, palatinose, lactose, galactooligosaccharide, oligotose, xylose and panose. Examples of the sugar alcohol usable in the present invention include xylitol, sorbitol, maltitol and inositol. It is also possible to use reducing starch hydrolyzates such as reducing dextrin and reducing oligosaccharides. It is preferable to select sugar alcohols commonly employed in foods (for example, sorbitol, maltitol) or so-called non-corrosive sugars (for example, coupling sugars and palatinose) from the viewpoints of low calories and low corrosiveness. When sugars such as glucose, fructose, isomerized sugars and thick malt syrup are used in the present invention, it is recommended to use these sugars in such an amount that the low-corrosiveness of the product is not deteriorated thereby.

If necessary, the sweetness qualities of the soft candy may be controlled by using sweeteners with a high sweetness intensity. Examples of the sweeteners include saccharin, sodium salt of saccharin, potassium salt of aspartame, glycyrrhitin, somatin, α-glucosylstevioside, aspartame and stevioside, with aspartame and stevioside being preferred.

In the soft candy, the weight ratio of erythritol to a sugar or a sugar alcohol other than erythritol preferably ranges from 3:7 to 7:3. Although erythritol would crystallize very rapidly to form large crystals, the coexistence of a sugar or a sugar alcohol inhibits the crystallization. As a result, fine crystals of erythritol are formed, which prevents the texture of the soft candy from roughening. Generally speaking, erythritol would crystallize in the form of fine crystals of not more than 40 μm in size in the presence of the sugar or the sugar alcohol in an amount of at least about 25% by weight, preferably at least 30% by weight, based on the total amount of the sugar or the sugar alcohol, and erythritol. When the content of the sugar or sugar alcohol is excessively large, however, it is difficult to achieve the characteristics of erythritol serving as the main sweetening component. Accordingly it is preferable to regulate the weight ratio of erythritol to the sugar or the sugar alcohol within the range as specified above.

A high-melting fat is preferably used as the fat to be used in the present invention by taking the shape retention and meltability in mouth of the soft candy into consideration. Among all, those having a melting point of from 30° to 40° C. are preferable therefor. A fat having an excessively low melting point achieves only an unsatisfactory shape retention of the soft candy. On the other hand, a fat having an excessively high melting point deteriorates the meltability in mouth. Thus they are both undesirable ones. Preferable examples of the fat include those obtained by fractionating palm oil or lauric oil, those obtained by hardening low-melting fats such as soybean oil or rapeseed oil, hard butters, non-tempered chocolate fats, ester-exchanged fats and oils and cacao butter.

In order to give a low-caloric soft candy, a sucrose fatty acid polyester may be used as the fat. An example of the sucrose fatty acid polyester is an ester of a saturated or unsaturated fatty acid having 12 to 18 carbon atoms with sucrose, which is a mixture of a hexaester, a heptaester and an octaester, with a content of the octaester being within about 60% or more based on total weight of the mixture. A specific example of the sucrose fatty acid polyester is OLESTRA (trade name, manufactured by PROCTOR & GAMBLE Co.) which has not yet been permitted as foods by Food and Drug Administration (F.D.A.) in the U.S.A.

The fat is used in an amount of from 5 to 30% by weight based on the soft candy, though the content may vary depending on the desired softness.

In order to control the softness of the soft candy and prevent the dripping of the fat from the soft candy, it is preferable to regulate the content of the fat to from 5 to 20% by weight, more preferably from 10 to 20% by weight, based on the soft candy.

As the emulsifier, those commonly employed for foods may be used. Since the soft candy is a composition comprising water and fat together, it is desirable to use a relatively hydrophilic emulsifier having an HLB (i.e., hydrophilic-lipophilic balance) of 11 or below to thereby promote the dispersion and emulsification of the fat and prevent the separation thereof. For example, it is advantageous to use a sucrose fatty acid ester or a polyglycerol fatty acid ester of an HLB of from 3 to 11. The use of such a hydrophilic emulsifier together with a comparatively lipophilic emulsifier is preferable from the viewpoint of improvement in emulsifying effect. As the polyglycerol fatty acid ester, it is preferable to select one having a degree of polymerization of from 4 to 12 and an average degree of substitution of from 1 to 3.

It is also possible to use a hydrophilic emulsifier together with a lipophilic emulsifier. Examples of the lipophilic emulsifier include lecithin, fatty acid monoglycerides, sorbitan fatty acid esters, propylene glycol fatty acid esters, sucrose fatty acid esters having an HLB of not more than 2, polyglycerol fatty acid esters having an HLB of not more than 2 and condensed ricinol eates. The emulsifier is used in an amount of from 0.1 to 5% by weight in the soft candy. In general, a large content of the emulsifier results in the deterioration of the taste. It is therefore preferable to use the emulsifier in an amount of from 0.1 to 1% by weight.

To produce the soft candy according to the present invention, erythritol is mixed with the sugar or the sugar alcohol and dissolved by adding water thereto. Then the mixture is concentrated by heating until the temperature of the mixtuer reaches about 140° to 200° C. and the fat containing the emulsifier is added thereto. By kneading the mixture, a soft candy dough is obtained.

Erythritol is highly resistant to heat and does not undergo browning even though it is concentrated by heating at a high temperature. Thus the heating temperature can be elevated to about 160° to 200° C. depending on the sugar or the sugar alcohol used together with erythritol. In general, a mixture of erythritol with a sugar alcohol remains stable without suffering from color change even though it is heated at a high temperature. Therefore such a mixture can be concentrated within a short period of time. When sugars such as thick malt syrup are used, in contrast thereto, the mixture is liable to be browned. In such a case, therefore, it is preferable to concentrate the mixture while taking care not to make the heating temperature excessively high (usually not higher than 170° C., preferably not higher than 150° C., more preferably not higher than 140° C.).

When the mixture is concentrated to reduce the moisture content to a definite level (usually not higher than 5%, preferably not higher than several percent), the fat and the emulsifier are added thereto. The addition is usually performed at a temperature of 120° C. or below, preferably 100° C. or below, so as to prevent the emulsifier from denaturing. It is recommended that the emulsifier has been previously dissolved in a small amount (for example, 1 to 3 times the volume of emulsifier) of water and dispersed in the fat. For example, the emulsifier is dissolved in a small amount of water at about 70° C., then added and dispersed in the fat under stirring. When the heating is carried out at a relatively low temperature of not higher than 120° C. and thus there is no risk of the denaturation of the emulsifier, it is also possible to previously blend erythritol with the sugar or the sugar alcohol, the fat and the emulsifier followed by concentration by heating.

It is also possible to use some portion of erythritol in the form of a fondant-like composition so as to give a "crispy" soft candy (see, for example, JP-A-1-225458 entitled "Flowable Sweetening Composition Containing Fine Crystals of Meso-erythritol"). When some portion of erythritol is to be used in the form of a fondant-like composition, the above-mentioned concentrate is cooled to about 80° C. and then the fondant-like composition is added thereto followed by kneading. The fondant-like composition may be added at a ratio of from 10 to 30% by weight based on the concentrate. In usual, the mixture is kneaded with the use of, for example, a kneader. The soft candy dough thus obtained is cooled and sheeted out with a roll. Then it is cut into pieces of the desired size with a cutter to thereby give soft candies.

To produce the soft candy according to the present invention, a mixture of erythritol with a sugar or a sugar alcohol other than erythritol and water is concentrated by heating, a fondant-like composition comprising a fat, in which an emulsifier has been dispersed, and erythritol as the main components are added thereto, and the resulting mixture is homogeneously kneaded.

The soft candy of the present invention comprising erythritol as the main sweetening component is not coarse but smooth in texture. In addition, it is low-caloric and low-corrosive compared with the existing ones containing sucrose.

To further illustrate the present invention in greater detail, the following Examples will be given. Unless otherwise noted, all percentages and parts are by weight.

EXAMPLE 1

15 parts of water was added to 90 parts of a mixture of erythritol with starch reducing oligosaccharide [GOH (hydrogenated linear oligosaccharides); manufactured by Mitsubishi Kasei Foods Corporation; comprising 35% of sorbitol, 27% of maltitol, 28% of maltotriitol, at least 10% of maltotetraitol] and the resulting mixture was concentrated by heating at the temperature as specified in Table 1. After cooling to 90 to 100° C., a molten mixture of 10 parts of a fat (Melano STS; manufactured by FUJI OIL CO., LTD.) with 0.2 parts of an emulsifier (Ryoto® sugar ester S-570; manufactured by Mitsubishi Kasei Corporation), which had been preliminarily prepared, was added to the concentrate and thoroughly mixed to thereby give a soft candy dough. Then this soft candy dough was sheeted out with a roll and cut into squares (1 cm×1 cm×0.8 cm). Thus soft candies were obtained. These soft candies were evaluated in texture and stickiness to tooth. Table 1 shows the results.

TABLE 1

| Ratio of erythritol to starch reducing oligosaccharide | 10:0 | 8:2 | 7:3 | 5:5 | 3:7 | 1:9 | 0:10 |
| --- | --- | --- | --- | --- | --- | --- | --- |
| Heating temp. (°C.) | 140 | 170 | 170 | 170 | 190 | 190 | 190 |
| Texture | X | X* | O | O | O | O | O |
| Stickiness | O | O | O | O | O | Δ | X |

Texture:
X: Coarse
O: Smooth and soft
*: Less coarse compared with the sample of 10:0.
Stickiness:
O: Not sticky
Δ: Somewhat sticky
X: Sticky

EXAMPLE 2

The procedure of the above Example 1 was repeated but using Malbit (manufactured by Hayashibara Seibutsu Kgagaku Kenkyusho K.K.; starch reducing sugar alcohol comprising maltitol as the main component) as a substitute for the starch reducing oligosaccharide GOH. The soft candies thus produced were evaluated in texture and stickiness. Table 2 shows the results.

TABLE 2

| Ratio of erythritol to Malbit | 10:0 | 8:2 | 7:3 | 5:5 | 3:7 | 1:9 | 0:10 |
| --- | --- | --- | --- | --- | --- | --- | --- |
| Heating temp. (°C.) | 140 | 165 | 165 | 165 | 165 | 170 | 170 |
| Texture | X | X* | O | O | O | O | O |
| Stickiness | O | O | O | O | O | Δ | X |

*: Less coarse compared with the sample of 10:0.

EXAMPLE 3

The procedure of the above Example 1 was repeated but using a 1:1 mixture of erythritol with maltitol, Maltrup (manufactured by Hayashibara Seibutsu Kgagaku Kenkyusho K.K.; thick malt syrup comprising maltose as the main component) or palatinose. The soft candies thus produced were evaluated in texture and stickiness. Table 3 shows the results.

TABLE 3

|  | Erythritol + maltitol | Erythritol + Maltrup | Erythritol + palatinose |
| --- | --- | --- | --- |
| Heating temp. (°C.) | 170 | 140 | 175 |
| Texture | O | O | O |
| Stickiness | O | O | O |

EXAMPLE 4

15 parts of water was added to 80 to 95 parts of a 1:1 mixture of erythritol with Maltrup and the resulting mixture was concentrated by heating to 170° C. After cooling to 90° to 100° C., a molten mixture of a fat (Melano STS) with an emulsifier (Ryoto® sugar ester S-570), which had been preliminarily prepared, was added to the concentrate and thoroughly mixed to thereby give a soft candy dough. Then this soft candy dough was sheeted out with a roll and cut into squares with a cutter. Thus soft candies were obtained. These soft candies were observed in the dispersion of the fat and evaluated in texture and stickiness to tooth. Table 4 shows the results.

TABLE 4

| Component (part) | | | |
| --- | --- | --- | --- |
| Erythritol | 47.5 | 45 | 40 |
| Maltrup | 47.5 | 45 | 40 |
| Fat | 5 | 10 | 20 |
| Emulsifier | 0.1 | 0.2 | 0.3 |
| Texture | O | O | O |
| Stickiness | O | O | O |
| Dispersion of fat | O | O | O |

Texture:
X: Coarse
O: Smooth and soft
*: Less coarse compared with the sample of 10:0.
Stickiness:
O: Not sticky
Δ: Somewhat sticky
X: Sticky
Dispersion of fat:
The dispersion of fat was estimated by observing the appearance of the soft candies based on the following criteria.
O: Homogeneous
X: Heterogeneous
(The fat for use in this estimation was previously dyed red by adding a small amount of a dye (Sudan IV). Sudan IV has not been permitted as an additive for foods. This estimation was conducted only for the purpose of examining the dispersion of fat in the soft candies.)

EXAMPLE 5

Water was added to 30 parts of erythritol and 50 parts of H-70 (Hydrogenated linear oligosaccharide; manufactured by Mitsubishi Kasei Foods Corporation; comprising 3% of sorbitol, 34% of maltitol, 44% of maltotriitol and at least 19% of maltotetraitol). After concentrating by heating to 170° C., the mixture was cooled to 120° C. Then 10 parts of whole fat milk powder, 5 parts of butter, 5 parts of a fat (Melano STS) and 0.2 parts of an emulsifier (Ryoto® Sugar Ester S-570) were added thereto. The resulting mixture was cooled to 90° C. and molded. The obtained product showed an excellent texture, no stickiness to tooth and the homogeneous dispersion of the fat.

While the invention has been described in detail and with reference to specific examples thereof, it will be apparent to one skilled in the art that various changes and modifications can be made therein without departing from the spirit and scope thereof.

What is claimed is:

1. A soft candy which comprises erythritol, a sugar or a sugar alcohol other than erythritol, a fat and an emulsifier, wherein the weight ratio of erythritol to the sugar or the sugar alcohol other than erythritol ranges from 7:3 to 3:7, wherein the content of the fat ranges from 5 to 20% by weight, and wherein the content of the emulsifier ranges from 0.1 to 5% by weight.

2. The soft candy as claimed in claim 1, wherein the content of the fat ranges from 10 to 20% by weight.

3. The soft candy as claimed in claim 1, wherein the content of the emulsifier ranges from 0.1 to 1% by weight.

4. A process for producing a soft candy which comprises
   concentrating a mixture of erythritol with a sugar or a sugar alcohol other than erythritol and water by heating the mixture to a temperature of 140° to 200° C. to reduce the moisture content to not more than 5%, adding a fat, in which an emulsifier has been dispersed, thereto at a temperature of not more than 120° C., and homogeneously kneading the resulting mixture, wherein the soft candy comprises erythritol, the sugar or the sugar alcohol other than erythritol, the fat and the emulsifier, and wherein the weight ratio of erythritol to the sugar or the sugar alcohol other than erythritol ranges from 7:3 to 3:7.

5. The process for producing a soft candy as claimed in claim 4, wherein the content of the fat ranges from 5 to 20% by weight.

6. The process for producing a soft candy as claimed in claim 5, wherein the content of the fat ranges from 10 to 20% by weight.

7. The process for producing a soft candy as claimed in any of claims 4, 5 or 6, wherein the content of the emulsifier ranges from 0.1 to 5% by weight.

8. A process for producing a soft candy which comprises concentrating a mixture of erythritol with a sugar or sugar alcohol other than erythritol and water by heating the mixture to a temperature of 140° to 200° C. to reduce the moisture content to not more than 5%, adding a fondant composition thereto at a temperature of not more than 120° C., wherein the fondant composition comprises a fat, in which an emulsifier has been dispersed, and erythritol as the main components, and homogeneously kneading the resulting mixture, wherein the soft candy comprises erythritol, the sugar or sugar alcohol other than erythritol, the fat and the emulsifier, and wherein the weight ratio of erythritol to the sugar or the sugar alcohol other than erythritol ranges from 7:3 to 3:7.

9. The process for producing a soft candy as claimed in claim 8, wherein the content of the fat ranges from 5 to 20% by weight.

10. The process for producing a soft candy as claimed in claim 9, wherein the content of the fat ranges from 10 to 20% by weight.

11. The process for producing a soft candy as claimed in any of claims 8, 9 or 10, wherein the content of the emulsifier ranges from 0.1 to 5% by weight.

12. The process for producing a soft candy as claimed in claim 7, wherein the content of the emulsifier ranges from 0.1 to 1% by weight.

13. The process for producing a soft candy as claimed in claim 11, wherein the content of the emulsifier ranges from 0.1 to 1% by weight.

* * * * *

UNITED STATES PATENT AND TRADEMARK OFFICE
CERTIFICATE OF CORRECTION

PATENT NO. : 5,567,467
DATED : October 22, 1996
INVENTOR(S) : Tsutomu Kondou; Akifumi Yuki, both of Kanagawa, Japan It is certified that error appears in the above-identified patent and that said Letters Patent is hereby corrected as shown below:

On the title page item [73], delete "Nikken Chemicals Company, Limited, Tokyo, Japan and insert "Mitsubishi Chemical Corporation and Nikken Chemicals Company, Limited"

Signed and Sealed this

Thirty-first Day of March, 1998

Attest:

BRUCE LEHMAN

*Attesting Officer*    *Commissioner of Patents and Trademarks*